Feb. 27, 1923.

F. HNILO ET AL.

BATH CABINET

Filed July 1, 1921

Inventors
Frank Hnilo
John Schultz
By
Attorney

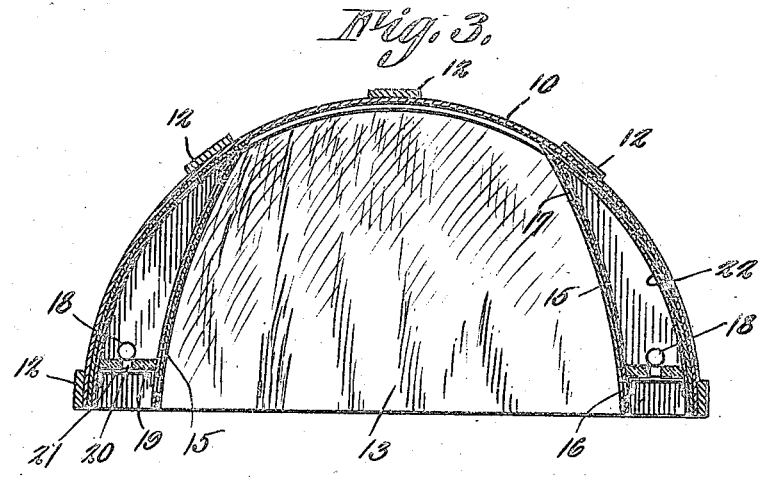
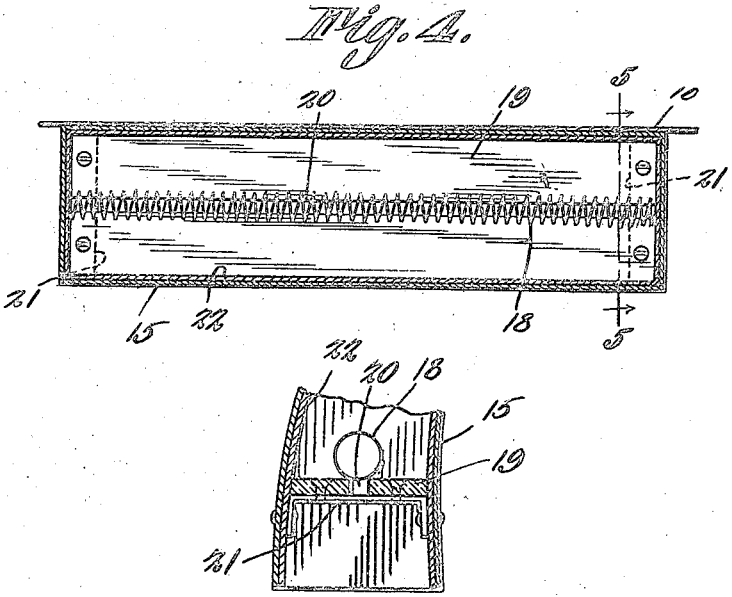

Patented Feb. 27, 1923.

1,446,704

UNITED STATES PATENT OFFICE.

FRANK HNILO, OF CICERO, AND JOHN SCHULTZ, OF CHICAGO, ILLINOIS.

BATH CABINET.

Application filed July 1, 1921. Serial No. 481,854.

*To all whom it may concern:*

Be it known that we, FRANK HNILO and JOHN SCHULTZ, citizens of the United States, residing at Cicero and Chicago, respectively, in the county of Cook and State of Illinois, have invented new and useful Improvements in Bath Cabinets, of which the following is a specification.

This invention relates to apparatus for applying hot air or vapor to the body of persons as a treatment for the relief or cure of certain bodily ailments, and more particularly to apparatus of this kind characterized by an enclosure for the body and a means for heating the air within the enclosure.

The invention has for its object to provide a very simple and highly efficient apparatus of the kind stated, and to this end it consists in a novel combination and arrangement of parts to be hereinafter described and claimed.

In order that the invention may be better understood, reference is had to the accompanying drawings forming a part of this specification, and in said drawings, Figure 1 is a perspective view of the apparatus;

Fig. 3 is a cross-section;

Fig. 4 is a horizontal section on the line 4—4 of Fig. 2, and

Fig. 5 is an enlarged cross-section on the line 5—5 of Fig. 4.

Figure 1:
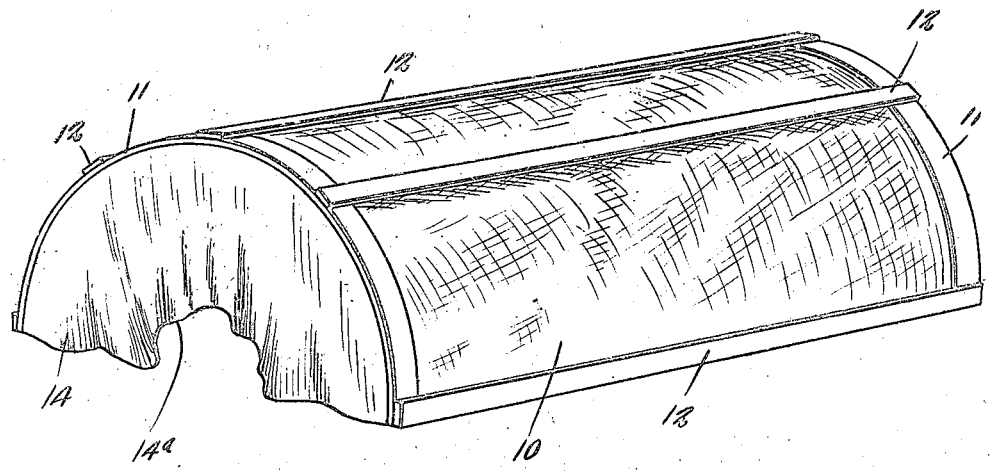
Figure 2:
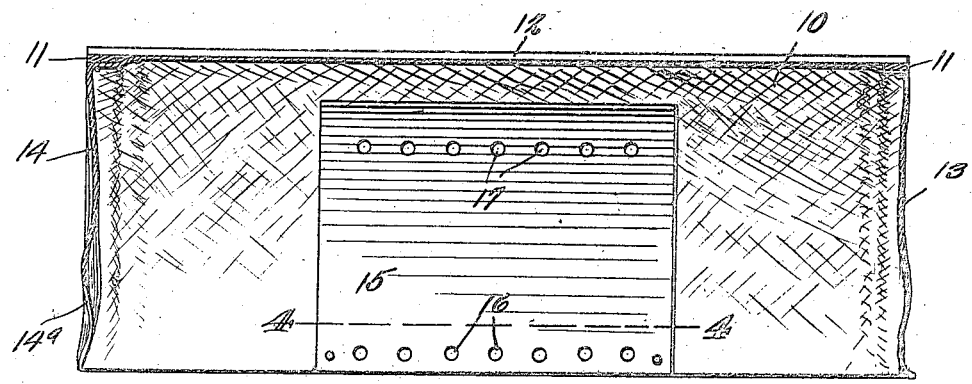
Fig. 2 is a central longitudinal section thereof.

Referring specifically to the drawings, the enclosure for the body is substantially semi-circular or arched in cross-section, and it is composed of a skeleton frame work and a covering 10 of suitable material which is air-tight or substantially so. The frame supporting this material is composed of transversely arched end bars 11 and longitudinal bars 12 connecting the same. One end of the enclosure is closed by an end flap 13, and the other end is closed by an end flap 14 formed with an opening or gap 14ª for the patient's neck. The patient lies on a suitable support on which the device is placed to completely enclose the patient with the exception of the head, the neck passing through the gap 14ª.

The means for heating the interior of the enclosure consists of two heating chambers, one of such being positioned on one side of the enclosure, and the other on the opposite side, and both being inside the enclosure.

Each heating chamber consists of a sheet metal casing 15 which seats against the side of the enclosure and is secured thereto in any approved manner, it being curved to conform to the curvature thereof. The casing extends in the direction of the length of the enclosure and it is positioned midway between its ends and has a sufficient length to supply the requisite volume of hot air. The casing also has an upward taper, as clearly shown in Fig. 3, and it is closed at its ends and at the top.

In the side wall of the casing 15 which faces the interior of the enclosure are air inlet apertures 16, and air outlet apertures 17, the former being near the bottom and the latter near the top of the casing.

In the casing 15 is mounted an electric heating element consisting of a helical resistance element or coil 18 seating on a horizontal base plate or partition 19 over a slot 20 in the latter. The plate 20 is, of course, composed of a suitable non-conducting material, and it is secured in the casing near the bottom thereof by brackets 21. The plate 19 extends throughout the entire length and width of the casing, and hence the latter is here closed except at the slot 20. The plate 19 is located above the air inlets 16, and the air outlets 17 are above the plate.

Suitable circuit connections for the resistance coils 18 will be provided, together with a switch, and as these form no part of the present invention they need not be described. It may be stated however, that a switch should be provided to make it possible to cut in either one or both resistance coils according to the degree of heat desired, or whichever side of the patient is to be exposed to the heat.

The casing 15 has an inner lining 22 of asbestos paper.

When the apparatus is in operation, the heated air escapes from the casings 15 through the top outlets 17 and cool air is drawn into the casings through the bottom inlets 16. The air rises through the slots 20 and it is heated as it comes in contact with the hot resistance coils 18. There is thus maintained a constant circulation of air in the enclosure and the heated air is distributed to all parts of the interior thereof. The enclosure becomes heated very rapidly with the expenditure of but a small amount of electric current.

The apparatus can be easily and cheaply constructed and it is nevertheless highly efficient in operation. The heating means are built into the apparatus, making the same a one-piece unit.

We claim:

1. A bath cabinet comprising an enclosure, heating chambers in the enclosure along opposite sides thereof, said chambers having bottom air inlets from the interior of the enclosure, and top air outlets into the interior of the enclosure, and heating elements in the chambers between the air inlets and outlets thereof.

2. A bath cabinet comprising an enclosure, heating chambers in the enclosure on opposite sides thereof, said chambers having bottom air inlets from the interior of the enclosure, and top air outlets into the interior of the enclosure, a partition in each chamber between the air inlets and outlets thereof, said partition having a longitudinal slot, and a heating element seating over the slot.

3. A bath cabinet comprising an enclosure, heating chambers in the enclosure along opposite sides thereof, said chambers having bottom air inlets from the interior of the enclosure, and top air outlets into the interior of the enclosure, a partition in each chamber between the air inlets and outlets thereof, said partition having a longitudinal slot, and an electric resistance coil seating over the slot.

4. A bath cabinet comprising an enclosure, heating chambers in the enclosure along opposite sides thereof, and supported by said sides, said chambers having bottom air inlets from the interior of the enclosure, and top air outlets into the interior of the enclosure, and heating elements in the chambers between the air inlets and outlets thereof.

5. A bath cabinet comprising an enclosure which is open at the bottom, heating chambers in the enclosure on opposite sides thereof, said chambers having bottom air inlets from the interior of the enclosure, and top air outlets into the interior of the enclosure, and heating elements in the chambers between the air inlets and outlets thereof.

In testimony whereof we affix our signatures.

FRANK HNILO.
JOHN SCHULTZ.